United States Patent
Pelletier

(10) Patent No.: US 6,737,975 B2
(45) Date of Patent: May 18, 2004

(54) MOTOR VEHICLE OCCUPANCY AND HIGH TEMPERATURE ALARM MODULE

(76) Inventor: Mark S. Pelletier, 5520 142nd St. West, #307, Apple Valley, MN (US) 55124

( * ) Notice: Subject to any disclaimer, the term of this patent is extended or adjusted under 35 U.S.C. 154(b) by 267 days.

(21) Appl. No.: 09/940,150

(22) Filed: Aug. 27, 2001

(65) Prior Publication Data

US 2003/0038712 A1 Feb. 27, 2003

(51) Int. Cl.[7] ............................................. G08B 23/00
(52) U.S. Cl. ................ 340/573.1; 340/430; 340/449; 340/588; 340/309.15; 340/438; 28/730.2; 28/735
(58) Field of Search ....................... 340/573.1, 426.24, 340/426.25, 426.26, 430, 449, 584, 588, 573, 587, 457, 425.5, 521–523; 28/730.2, 735

(56) References Cited

U.S. PATENT DOCUMENTS

| | | | | |
|---|---|---|---|---|
| 5,518,176 A | | 5/1996 | Turner et al. .............. 236/49.3 |
| 5,793,291 A | * | 8/1998 | Thornton .................. 340/573.1 |
| 5,966,070 A | * | 10/1999 | Thornton .................. 340/425.5 |
| 6,104,293 A | * | 8/2000 | Rossi ....................... 340/573.1 |
| 6,166,627 A | * | 12/2000 | Reeley ........................ 340/426 |
| 6,345,767 B1 | * | 2/2002 | Burrus et al. ................ 236/1 R |
| 6,480,103 B1 | | 11/2002 | McCarthy et al. ........ 340/425.5 |
| 6,496,106 B1 | * | 12/2002 | Rodriguez ............... 340/425.5 |
| 2002/0080014 A1 | * | 6/2002 | McCarthy et al. .......... 340/426 |

* cited by examiner

Primary Examiner—Daryl Pope
(74) Attorney, Agent, or Firm—Daniel A. Dettlaff

(57) ABSTRACT

A machine to turn on the occupancy sensor(s) of a motor vehicle using a temperature sensing element. The temperature element senses a dangerously high temperature in the passenger compartment of a motor vehicle and energizes the occupancy sensors. The occupancy sensors energize for a time period sufficient to determine the presence or absence of an occupant. If no occupant is detected, the occupancy sensors de-energize after a set period of time. If an occupant is detected, an audible alarm is enabled to draw attention to the motor vehicle. Once the alarm is active, a key must be used to reset it. If no occupant is detected each operation of a door switch will cause an additional sensing provided the temperature remains dangerously high. This logic is only energized or enabled when a passenger compartment is dangerously high.

20 Claims, 4 Drawing Sheets

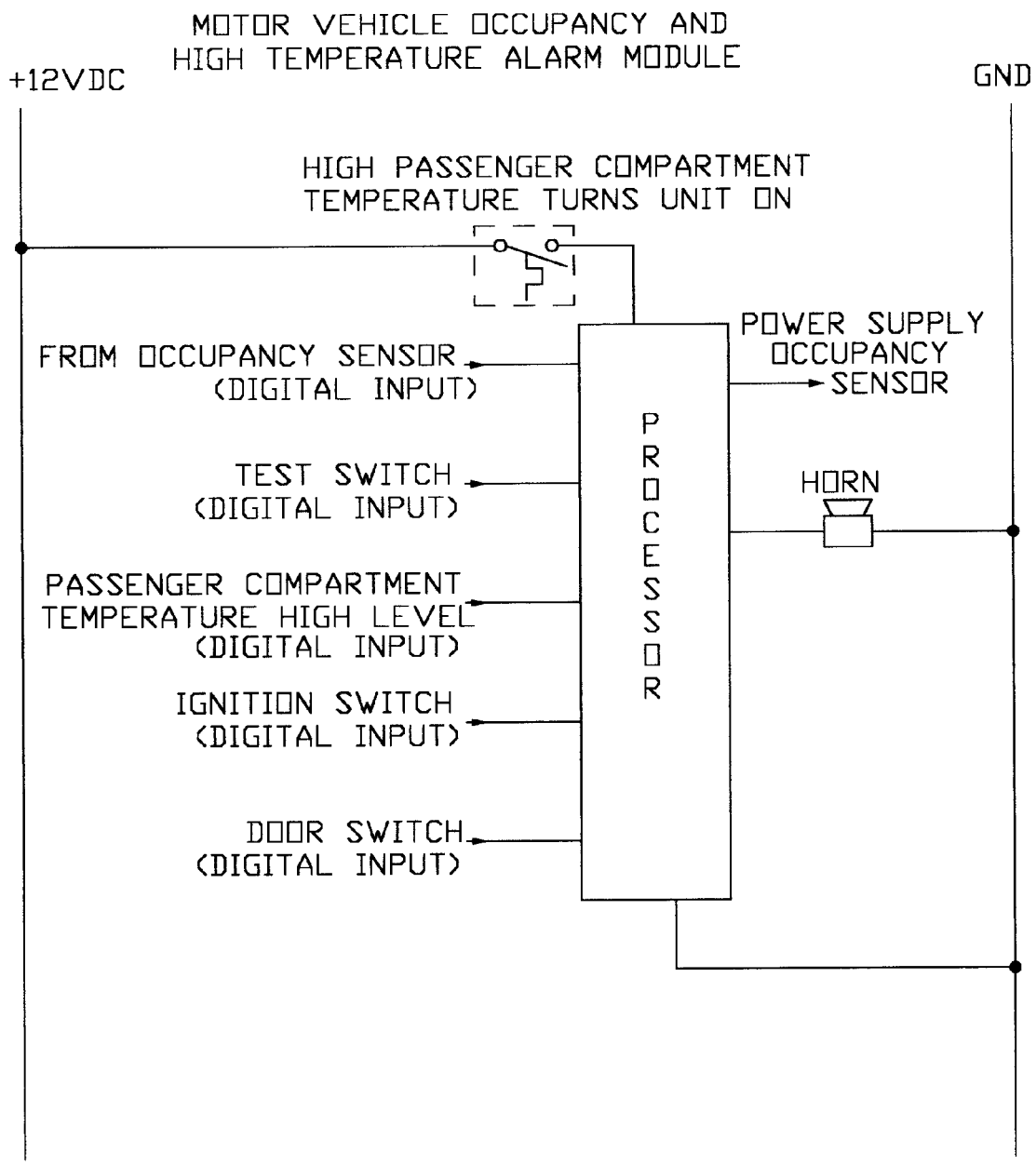

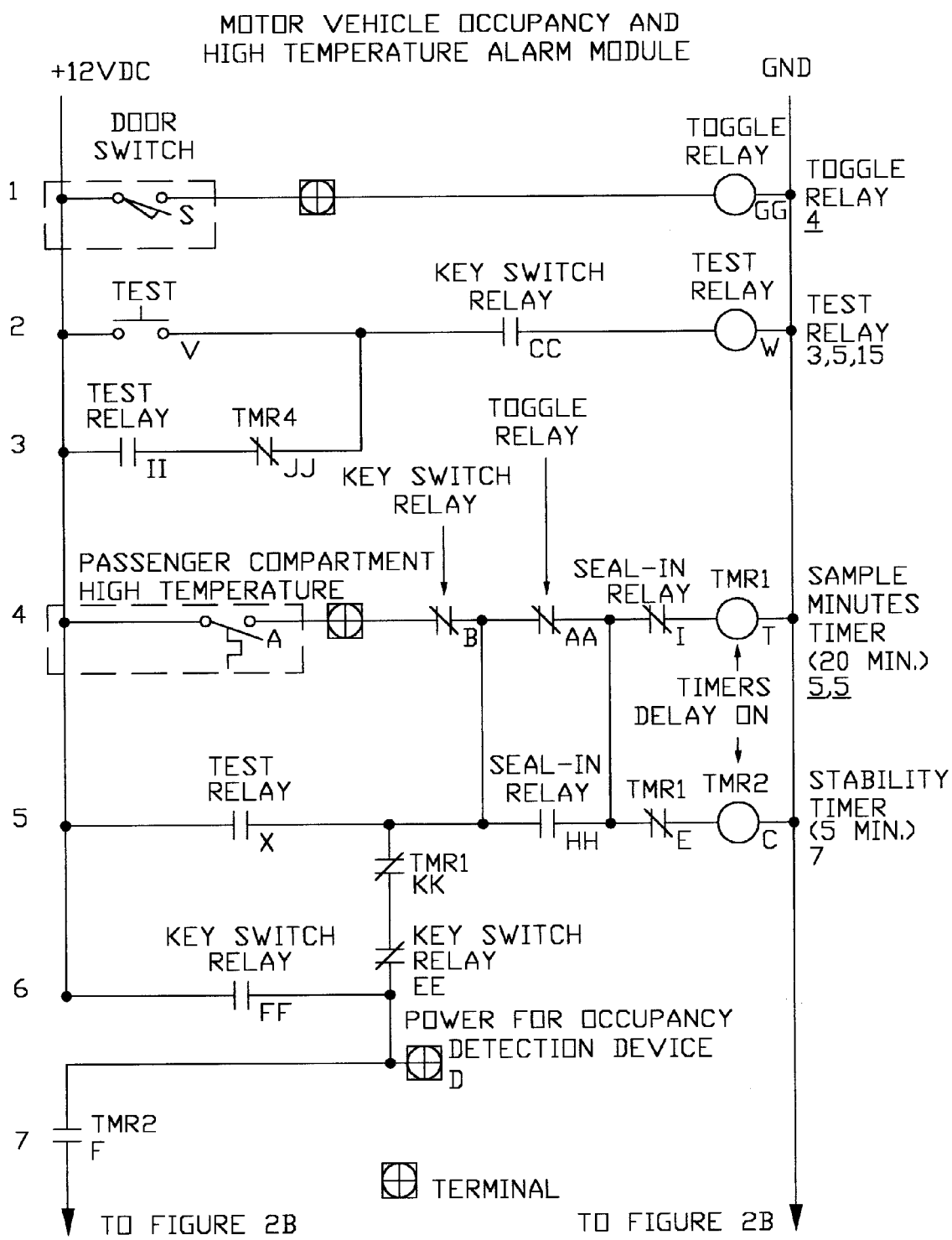

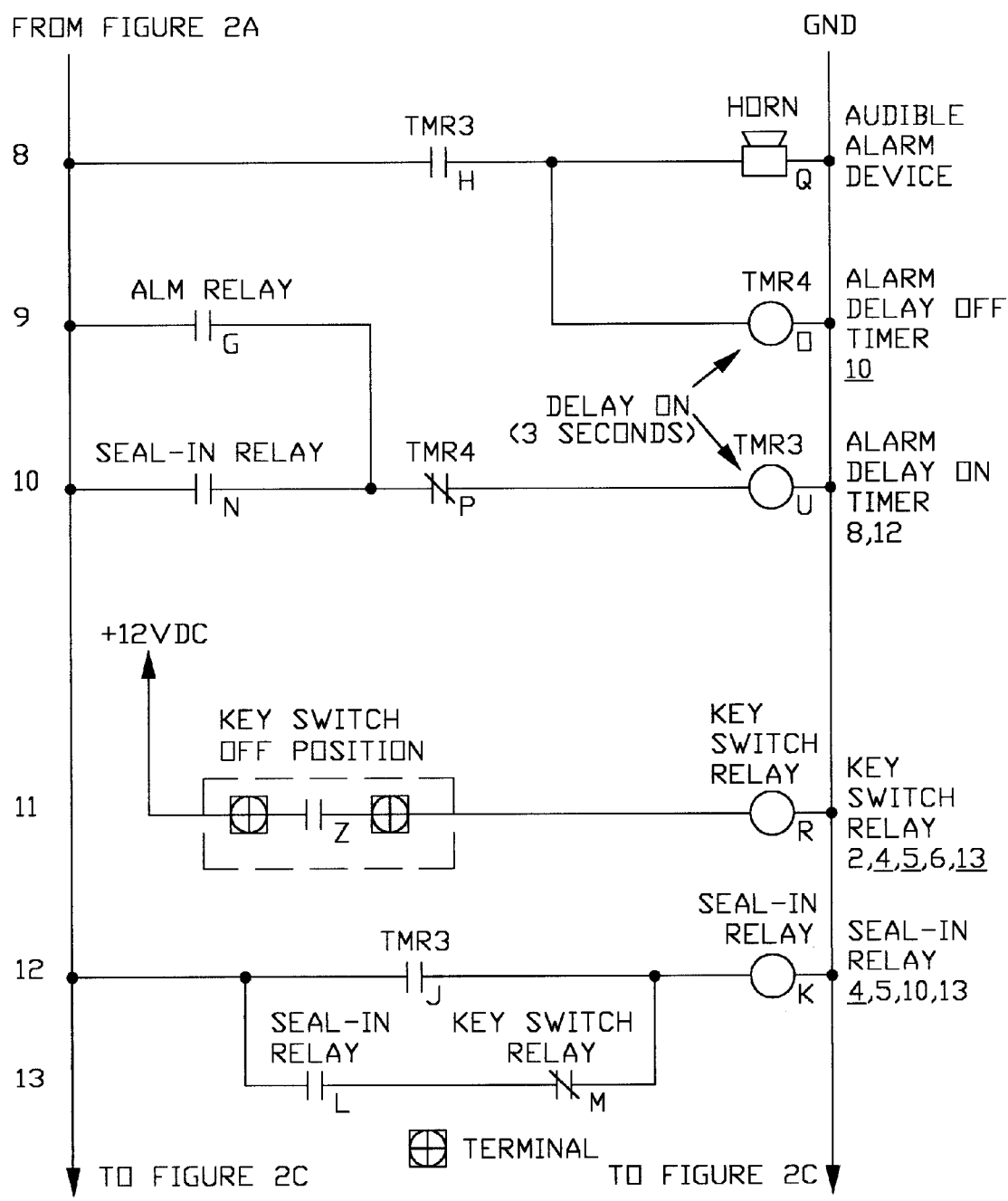

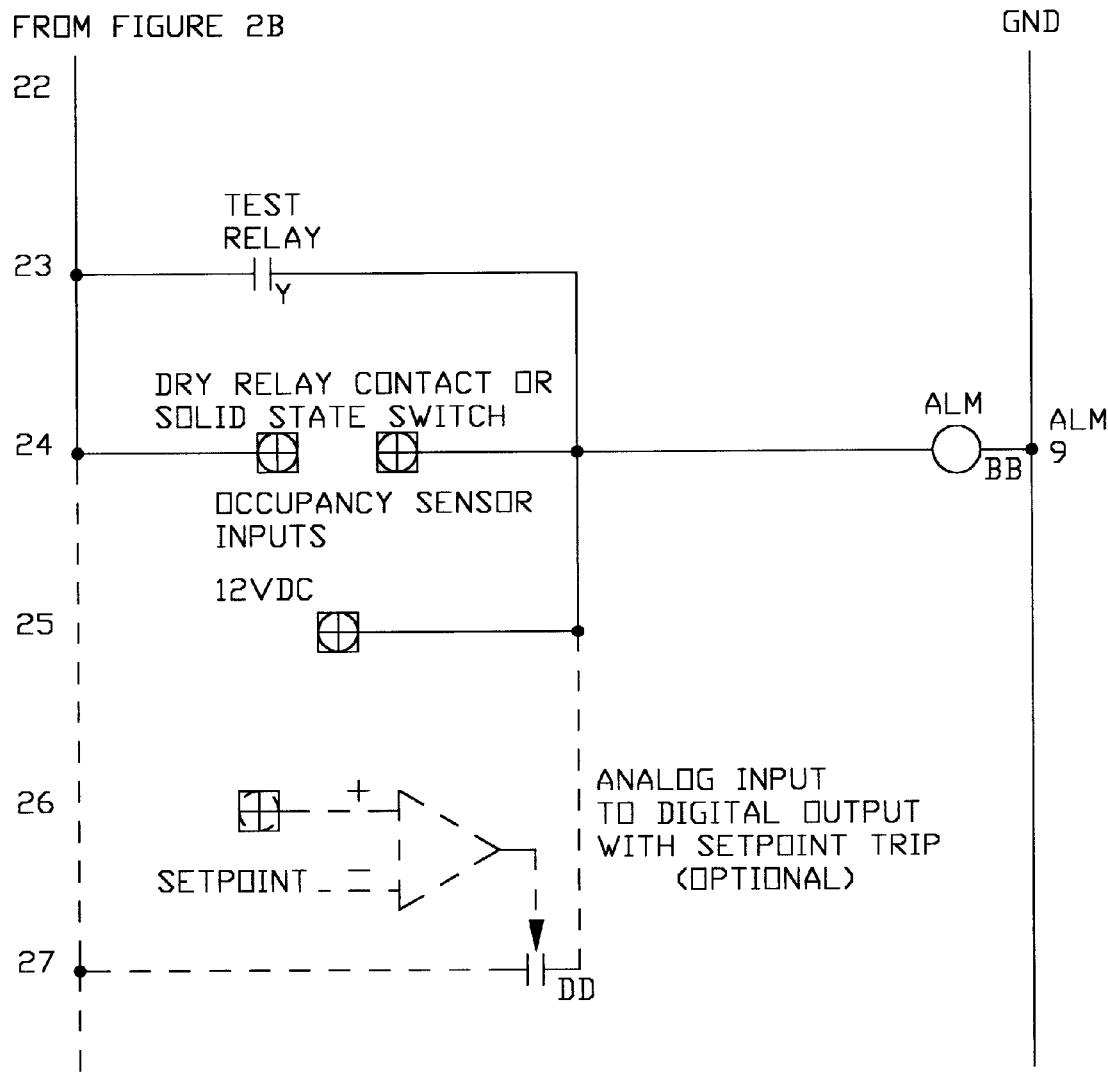

MOTOR VEHICLE OCCUPANCY AND HIGH TEMPERATURE ALARM MODULE

BACKGROUND OF THE INVENTION

This invention relates generally to the field of devices for detecting the presence of an occupant present in an motor vehicle passenger compartment, and more particularly, the detection of a dangerously high temperature, controlled by logical conditions to activate an audible alarm.

Occupancy sensors are known, and vary in many varieties and varying complexity, such as within the confines of motor vehicles.

An occupancy sensor that is typical of the prior art is disclosed in U.S. Pat. No. 6,270,116 This prior art occupancy sensor consists of an apparatus which detects electromagnetic radiation above the seat, and a processor determines the presence of an occupying item, based on the detected electromagnetic radiation and is distinguished between different occupying items to thereby obtain information about the occupancy of the seat. An apparatus for controlling a deployable occupant restraint device in a vehicle to protect the occupant in the seat of the vehicle during a crash includes the evaluating apparatus and the processor further affects the deployment of the occupant restraint device based on the determined presence or absence of an occupying item and the information obtained by the occupancy of the seat.

Another occupancy sensor that is typical of the prior art is a seat switch and a seatbelt switch requiring a lesser degree of complexity.

Yet another occupancy sensor is an audio pickup and an amplifier that would turn on to amplify a baby's cries or children's sounds to an outside speaker to bring attention to the motor vehicle, acting as an alarm.

SUMMARY OF THE INVENTION

The primary object of the invention is To use the controlled output of an occupancy sensor like or similar to those previously described, together with a temperature element to activate an audible alarm. When an occupant is detected by the occupancy sensor and a dangerously high temperature exists in the passenger compartment (may include the trunk area) of the motor vehicle an audible alarm is activated.

Another object of the invention is To provide a method to energize the occupancy sensor(s) for a period of time, only long enough to determine the absence or presence of an occupant and then enter a "sleep mode" and shut down the occupancy sensor(s) to conserve power when the motor vehicle is not in use.

Another object of the invention is To provide a method to re-energize the occupancy sensors after the "sleep mode" has turned them off with the operation of a door switch.

A further object of the invention is To provide a period of time, when the vehicle is not in use, for the occupancy sensors to power up, warm up, and stabilize their output(s) before these output(s) can activate an alarm.

Yet another object of the invention is To provide logic allowing the occupancy sensor(s) power to be connected and controlled at a single electrical termination whether the vehicle is in or is not in use.

Still yet another object of the invention is To provide an alarm reset sequence, whereby only a key holder for the vehicle can reset the alarm once an alarm condition is activated.

Other objects and advantages of the present invention will become apparent from the following descriptions, taken in connection with the accompanying drawings, wherein, by way of illustration and example, an embodiment of the present invention is disclosed.

A machine for combining the output of an occupancy sensor and a temperature sensing element comprising: a logical network of timers, switches, relays and interconnections by methods of relay logic, ladder logic, Boolean logic operators, software algorithms, or a combination of any or all of the above mentioned methods, to produce a reliable activation of an audible alarm. If an occupant is detected in a motor vehicle's passenger compartment when the vehicle is not in use, and a dangerously high temperature exists in the passenger compartment, an audible alarm is activated.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 1 is a perspective view of the invention.

FIGS. 2A–2C is a detailed view of the logical network of timers, switches, relays and interconnections as one method to demonstrate operation.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

As illustrated in FIG. 1, a microprocessor receives initial power up through a temperature switch.

Additional inputs are received from occupancy sensor(s), the ignition switch, and passenger door switches. A test switch is included but may or may not be remotely located.

As illustrated in FIG. 2 the microprocessor contains symbols of algorithms performing the functional logic of timers and relays with their assigned interconnections. The following described steps are used to demonstrate the various logical tasks incorporated in this machine.

A key switch and an ignition switch are the same device.

STEP 1. The logic module will operate on the vehicle's 12VDC battery power but in future models, a lower voltage for logic state indication to Boolean logic operators or a result of other software algorithms may be used or a combination thereof.

STEP 2. A temperature sensitive switch "A" interrupts the power or logic to the occupancy sensor until such time the passenger compartment exceeds a preset level. When this level is exceeded, power is supplied to the normally closed key switch relay contact "B". This temperature sensing element might be a bi-metalic switch, an RTD circuit, a thermocouple circuit, or any type device that could be made to conduct or operate as a switch at a specific temperature.

STEP 3. The power will then pass through the normally closed key switch relay contact "B", which is closed when the key switch is in the "OFF" position. When the key switch is on, power to this logic is interrupted.

STEP 4. With a high temperature in the passenger compartment, and the key switch relay in the "OFF" position, power is supplied to the stability timer "C", the sample minutes timer "T"; by means of the normally closed toggle relay contact "AA"; and to the occupancy sensors "D" through the normally closed TMR1 contact "KK" and the key switch relay contact "EE". With the toggle switch relay contact "AA" closed and the seal-in contact "I" closed, the total minutes timer "T" begins timing the total sense time.

The stability timer "C", begins timing a delay on that interrupts power to the alarm circuits with its normally open contact "F". The occupancy sensor is on and warming up to assume a logical state and allows for occupants to enter or exit before permitting STEP 5.

STEP 5. When the stability timer period is complete, the stability timer contact "F", closes to energize the remaining components of the alarm control circuits.

STEP 6. When the occupancy sensor detects an occupant, and the previously mentioned conditions remain true, the occupancy sensor logic output for this condition is fed to the ALM relay coil "BB". Its normally open contact "G" will close allowing power to travel to the normally closed contact of TMR4 "P" and then to the coil of TMR3 "U".

OPTION: An analog input element "DD" could be used to convert a standard signal, like 4–20 milliamperes or 0–10VDC etc., to compare with a threshold level quantity representing an occupant is detected, and provide a logic output to the ALM relay "BB". The preferred operation is to operate the ALM relay with a digital output from the occupancy sensor(s) for ease of standardization and to promote this as an industry standard. (shown in dashed lines)

STEP 7. TMR3 "U" begins to count for a preset period and when it is reached, the normally open contact TMR3 "H" closes and allows power to the audible alarm device "Q". At the same time, the normally open contact of TMR3 "J" closes and energizes the seal-in relay "K". The seal-in relay contact "L" closes, and through the normally closed contact of the key switch relay "M", latches the seal-in relay on. Another seal-in relay contact "N" now sustains the alarm condition provided by the occupancy sensors, insuring the alarm condition remains until responsible human intervention cancels the alarm.

STEP 8. The horn is now on, and at the same time, TMR4 "O" begins to time its preset interval. When complete, the normally closed contact of TMR4, "P" opens, resetting timer TMR3, opening TMR3's contact "H", causing the horn "Q" to turn off for a period and in the same instant, resets TMR4 dosing TMR4's contact, "P" until TMR3 times its interval once again, and closes its contact "H" sounding the horn again. These interval times can be adjustable. The horn turns on, then off, until the alarm is reset by turning the key switch "Z" to the on position, energizing the key switch relay "R", opening key switch relay contact "M", de-energizing (resetting) the seal-in relay "K", the stability timer "C" and the total minutes timer "T". With the operation of the key switch, the stability timer is reset by the key switch relay contact "B", allowing time for the passenger to enter and start the motor vehicle or exit the motor vehicle before arming the alarm. The toggle relay contact "AA" is bypassed when there is an alarm condition so the door switch can not reset the alarm with seal-in relay contact "HH".

STEP 9. Door switch "S" operates toggle relay "GG". When the passenger compartment door is opened, door switch "S" doses and energizes the toggle relay (dome light on) to open the normally dosed contact "AA", and resets TMR1 timer closing TMR1 contact "E", and resets the stability timer, restarting the occupant warm up and sense cycle. When the sample minutes timer completes its timing, power is removed from the occupancy sensors and other elements when no occupant is detected. The normally closed contact of TMR1 "E" opens, resetting TMR2, opening stability timer contact "F". Power to the occupancy detector (s) remain interrupted until a door is opened and closed again, the temperature switch opens then closes, or the key switch is turned on then off resetting TMR1 and TMR2 for another occupancy check. If no occupant is detected, the occupancy detectors are turned off to conserve power.

In an alarm condition, normally closed seal-in relay contact "I" opens to reset TMR1, holding it off and it cannot enter the sleep mode. Normal sample minutes timer operation resumes when the alarm condition is cleared.

STEP 10. A system test is accomplished by depressing pushbutton test switch "V", with the key switch in the on position energizing the key switch relay, closing the key switch relay contact "CC". This energizes test relay "W", closing test relay contact "X" to simulate a passenger compartment high temperature and the key switch is in the off position; and test relay contact "Y" to simulate the occupancy sensor detects an occupant. The test relay will not latch the seal in relay because the normally closed key switch relay contact "M" is now open. The test relay will latch itself with contact "II" to allow TMR1 and TMR2 to sequence an alarm. The test mode ends when the horn is activated one time and TMR4 opens its contact "JJ" resetting the test relay latch or when the key switch is turned off, disabling the test mode. A test cannot begin unless a key holder has the key switch in the on position. The key switch refers to the ignition switch in all references.

STEP 11. With the key switch not in the off position, normally open key switch relay contact "FF" closes to provide power to the occupancy sensors while driving the car. This eliminates the need for a separate power source when installing this unit with the occupancy sensor. At the same time, the normally closed key switch relay contact "EE" opens and prevents back feeding power to the control circuits, keeping this supply point isolated until the key switch is turned off.

What is claimed is:

1. An apparatus for monitoring a vehicle having a compartment, comprising:
    at least one occupancy sensor for generating a first signal indicative of the compartment being occupied;
    a temperature element for generating a second signal indicative of vehicle compartment ambient temperature exceeding a preset limit; and
    a logic circuit for generating an audible alarm signal responsive to the first and second signals being generated during a timed sampling period,
    wherein the timed sampling period is reset and initiated after each simultaneous occurrence of a vehicle door being closed and the vehicle being off and the second signal being generated.

2. The apparatus as in claim 1, wherein the at least one occupancy sensor is not energized except during the timed sampling period and while the vehicle is not off.

3. The apparatus as in claim 1, wherein the timed sampling period is reset and initiated after expiration of a delay period following each simultaneous occurrence of the vehicle door being closed and the vehicle being off and the second signal being generated.

4. The apparatus as in claim 3, wherein the timed sampling period ends a preset time after it is initiated.

5. The apparatus as in claim 3, wherein the timed sampling period ends when the vehicle door is not closed.

6. The apparatus as in claim 3, wherein the timed sampling period ends when the vehicle is not off.

7. The apparatus as in claim 1, wherein the at least one occupancy sensor is energized and communicatively coupled to an occupant restraint control system when the vehicle is not off.

8. The apparatus as in claim 1, wherein the timed sampling period ends a preset time after it is initiated.

9. The apparatus as in claim 1, further including means for resetting to reset the alarm signal, wherein after the alarm signal is generated, the logic circuit seals-in the alarm signal until interrupted by the means for resetting.

10. The apparatus as in claim 1, wherein the timed sampling period ends when the vehicle is not off.

11. The apparatus as in claim 1, wherein the compartment is a trunk.

12. The apparatus as in claim 1, wherein the timed sampling period ends when the vehicle door is not closed.

13. The apparatus as in claim 1, further comprising a means for bypassing a portion of the logic circuit to test generation of the alarm signal.

14. The apparatus of claim 1, wherein the at least one occupancy sensor is not powered unless the second signal is being generated.

15. An apparatus for monitoring a vehicle having a compartment, comprising:

means for generating a first signal indicative of the compartment being occupied;

means for generating a second signal indicative of vehicle compartment ambient temperature exceeding a preset limit; and means for generating an audible alarm signal responsive to the first and second signals being generated during a timed sampling period, wherein the timed sampling period is reset and initiated after each simultaneous occurrence of a vehicle door being closed and the vehicle being off and the second signal being generated.

16. The apparatus of claim 15, wherein the timed sampling period is reset and initiated after expiration of a delay period following each simultaneous occurrence of the vehicle being closed and the vehicle being off and the second signal being generated.

17. The apparatus of claim 16, wherein the timed sampling period ends a preset time after it is initiated or when the vehicle door is not closed or upon the vehicle being not off.

18. A method of monitoring a vehicle having a compartment, comprising:

generating a first signal indicative of the compartment being occupied;

generating a second signal indicative of vehicle compartment ambient temperature exceeding a preset limit; and generating an audible alarm signal responsive to the first and second signals being generated during a timed sampling period, wherein the timed sampling period is reset and initiated after each simultaneous occurrence of a vehicle door being closed and the vehicle being off and the second signal being generated.

19. The method of claim 18, wherein the timed sampling period is reset and initiated after expiration of a delay period following each simultaneous occurrence of the vehicle being closed and the vehicle being off and the second signal being generated.

20. The method of claim 18, wherein the timed sampling period ends a preset time after it is initiated or when the vehicle door is not closed or upon the vehicle being not off.

* * * * *